United States Patent [19]

Magana

[11] 4,286,368

[45] Sep. 1, 1981

[54] FREEZE PLUG EJECTOR AND INJECTOR

[76] Inventor: Joseph Magana, 6607 S. Loch Alene Ave., Pico Rivera, Calif. 90660

[21] Appl. No.: 84,096

[22] Filed: Dec. 3, 1979

[51] Int. Cl.[3] .............................................. B23P 19/04

[52] U.S. Cl. .......................................... 29/267; 81/3.49

[58] Field of Search ................. 29/267, 270, 256, 266, 29/257, 259; 81/3.48, 3.49, 3.47

[56] References Cited

U.S. PATENT DOCUMENTS

| | | | |
|---|---|---|---|
| 1,517,250 | 12/1924 | Sawyer | 81/3.49 |
| 2,441,756 | 5/1948 | De Swart | 29/267 X |
| 3,599,311 | 8/1971 | Ellis | 29/266 X |
| 4,011,649 | 3/1977 | Hawkins | 29/267 |

FOREIGN PATENT DOCUMENTS

| | | | |
|---|---|---|---|
| 28597 | 3/1925 | France | 81/3.49 |
| 11383 | of 1898 | United Kingdom | 81/3.49 |

*Primary Examiner*—Robert C. Watson
*Attorney, Agent, or Firm*—George J. Netter

[57] ABSTRACT

A tool with a body member which can be braced between the engine block and an adjacent wall of the automobile has a sharp-pointed member movable under the control of a hand operated lever arm to penetrate a freeze plug in the engine block and become wedged in the plug so on reverse movement of the lever arm the plug is removed from the engine block. For use in inserting a new plug, the sharp-pointed member is replaced by a flat headed one which drives a new freeze plug into the appropriate block opening on appropriate operation of the lever arm.

1 Claim, 15 Drawing Figures

FREEZE PLUG EJECTOR AND INJECTOR

The present invention relates to a tool for removing freeze plugs from the block of an automobile internal combustion engine and replacing the removed plugs with new ones.

SUMMARY OF THE INVENTION

In the practice of the present invention there is provided a tool having a body member which can be braced between the engine block and an adjacent wall of the automobile. A sharp-pointed member is movable under the control of a hand operated lever arm to penetrate a freeze plug in the engine block, become wedged in the plug whereby on reverse actuation of the lever arm the plug is removed from the engine block wall.

For use in inserting a new plug the sharp-pointed member is replaced by a flat headed means which drives a new freeze plug into the appropriate block opening by hand operation of the lever arm.

DESCRIPTION OF A PREFERRED EMBODIMENT

Figure 1:
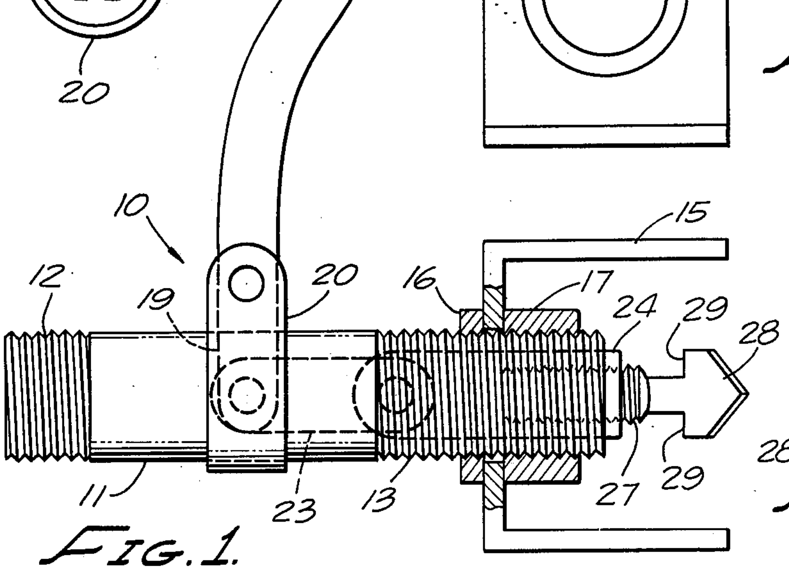
FIG. 1 is a side elevational, partially sectional view of the tool of the invention.
Figure 7A:
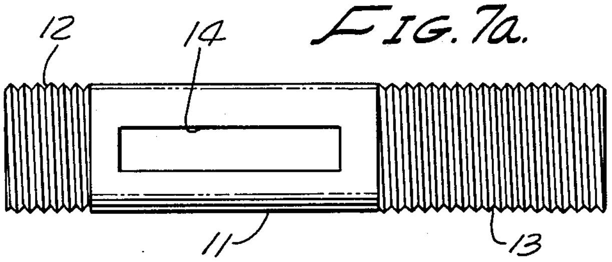
FIGS. 7 *a* and *b,* respectively, are a top plan view and end elevational view of the tool body.
Figure 7B:
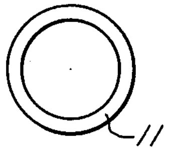

With reference now to the drawings and particularly FIGS. 1 and 7*a,* the tool of the present invention is identified generally as at 10 and is seen to include an elongated pipelike body 11, the ends of which are threaded as at 12 and 13 and the central wall portion of which includes an elongated generally rectangular slot 14. A generally U-shaped spacer frame or backet 15 has an opening in its cross-bar via which it is threaded onto the end 13 of the body 11 and secured thereto by nuts 16 and 17 with the legs of the bracket extending parallel to the body 11 and outwardly from the end 13.

Figure 2:
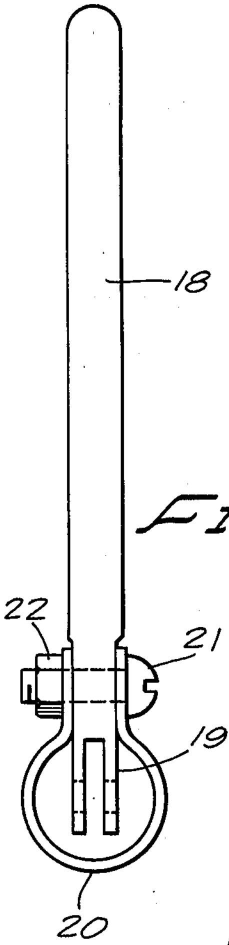
FIG. 2 is an end elevational view of the tool of FIG. 1.

Referring now to both FIGS. 1 and 2, a lever arm 18 has a bifurcated end 19 which is received through the slot-like opening 14 in the body 11. A strap 20 wraps around the outside of the unthreaded portion of the pipe body 11 and is secured to the lever arm 18 by a bolt 21 which serves as a pivot point for the lever arm and a nut 22.

Figure 3A:
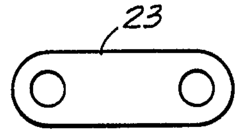
FIGS. 3*a* and *b* are side elevation and top plan views, respectively, of a link in the tool.
Figure 4A:
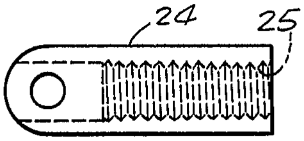
FIGS. 4*a, b,* and *c* depict sectional elevational, sectional top plan and end elevational views, respectively, of a connector.
Figure 4C:
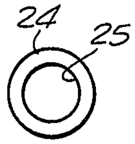
Figure 3B:
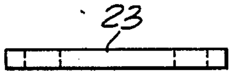
Figure 4B:
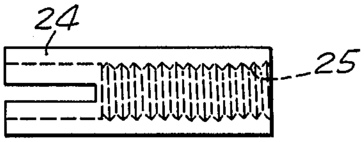

Turning now to FIGS. 3 and 4, the bifurcated end 19 of the lever arm 18 is rotatively connected to one end of a link 23 the other end of which is rotatively connected to the yoke end of a connector 24. The opposite end of the connector includes an axially extending threaded opening 25. As shown best in FIG. 1, the link 23 and connector 24 lie entirely within the bore of the pipe body 11 and are movable longitudinally along the pipe body by actuation of the lever arm 18.

Figure 6A:
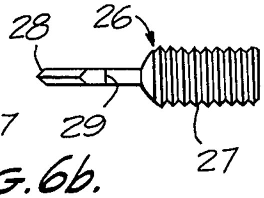
FIGS. 6*a* and *b* are side elevational and end elevational views of a penetrating member.
Figure 6B:
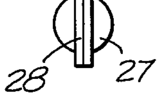

A piercing means 26 includes a threaded shank 27 for threaded receipt within the connector opening 25 as in FIG. 1, and at its outer end includes a sharp pointed piercing means 28 which is flat (FIG. 6*b*) with shoulders 29 on its back side.

In use of the tool 10 for removing a freeze plug, the pipe body 11 is located between the freeze plug (not shown) to be removed and an outer wall (not shown) of the vehicle. The spacer frame 15 is then positioned to press against the engine block (not shown) at each side of the freeze plug with the point 28 being located directly opposite the freeze plug. When so positioned, the lever arm 17 is then moved by hand so that the point 28 pierces the freeze plug. In many cases, on moving the lever arm in the opposite direction at this time, the freeze plug can be removed. Occasionally, it will be necessary to rotate the piercing means 28 within the freeze plug so that the shoulders 29 will lock behind the pierced slot in the freeze plug assisting the removal of the plug.

Figure 9B:
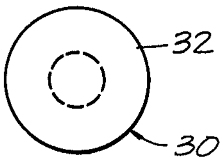
FIGS. 9*a* and *b* illustrate a side elevational and end elevational views of a driver head.
Figure 9A:
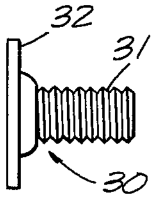
Figure 5:
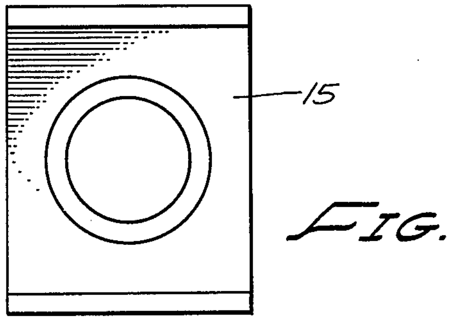
FIG. 5 is an end elevational view of a spacer frame.

With reference now to FIGS. 9*a* and 9*b,* a pressing member 30 is shown including a threaded shank 31 and a transversely extending flat disk 32 at one end. With the piercing means 28 removed, the threaded shank is received within the connector opening 25 and the tool generally is in line with the now open freeze plug opening in the engine block within which a new freeze plug is to be inserted. As before, the tool 10 has the spacer frame 15 contacting the engine block and the body end 12 wedged against a vehicle adjacent wall. Then the freeze plug is positioned against the flat disk 32 and on operation of the lever arm 17 the freeze plug is forced into place into the block opening.

Figure 8:
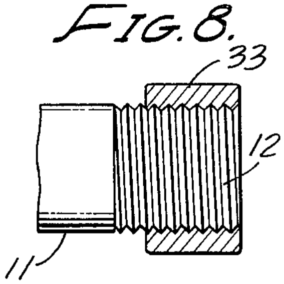
FIG. 8 depicts means for extending the length of tool body of FIG. 7*a*.

Although a pipe body 11 approximately four (4) inches long is satisfactory to provide the wedging condition between motor block and adjacent vehicle wall in most cases, additional length may be required at times. This is provided by a nut 33 adjustably threaded onto the end 12 of the body 11 (FIG. 8).

I claim:

1. Apparatus for removing a freeze plug from an automotive engine block mounted within automotive vehicle walls, comprising:

hollow open-ended pipe means having threaded end portions and a slotlike opening in a sidewall;

a generally C-shaped member having a threaded opening received onto one end of the pipe means with both arms of the member extending outwardly of the pipe means end;

a handle having an end portion extending through the slotlike opening in the pipe means with the remainder of the handle extending outwardly thereof;

a strap clamped about the pipe means and pivotally interconnected with the handle;

elongated means pivotally connected to the end of the handle within the pipe means and extending towared the pipe means end carrying the C-shaped member; and a generally pointed, platelike spear means interconnected with the elongated means and extending outwardly of the pipe means.

* * * * *